US006246428B1

(12) United States Patent
Look et al.

(10) Patent No.: US 6,246,428 B1
(45) Date of Patent: Jun. 12, 2001

(54) METHOD AND SYSTEM FOR THERMAL MASS TRANSFER PRINTING

(75) Inventors: Thomas F. Look, Anoka; Michael G. O'Reilly, Vadnais Heights; Thanh-Huong T. Nguyen, Oakdale; Craig A. Schmidt, Lindstrom, all of MN (US)

(73) Assignee: 3M Innovoative Properties Company, St. Paul, MN (US)

( * ) Notice: Subject to any disclaimer, the term of this patent is extended or adjusted under 35 U.S.C. 154(b) by 0 days.

(21) Appl. No.: 09/309,837

(22) Filed: May 11, 1999

(51) Int. Cl.[7] ........ B32B 5/16
(52) U.S. Cl. ........ 347/212
(58) Field of Search ........ 347/173, 102, 347/187, 212

(56) References Cited

U.S. PATENT DOCUMENTS

| | | | |
|---|---|---|---|
| 2,407,680 | 9/1946 | Palmquist et al. . | |
| 3,190,178 | 6/1965 | McKenzie . | |
| 3,684,348 | 8/1972 | Rowland . | |
| 4,025,159 | 5/1977 | McGrath . | |
| 4,561,789 * | 12/1985 | Saito | 347/102 |
| 4,801,193 | 1/1989 | Martin . | |
| 4,847,237 | 7/1989 | Vanderzanden . | |
| 4,895,428 | 1/1990 | Nelson et al. . | |
| 4,896,943 | 1/1990 | Tolliver et al. . | |
| 4,938,563 | 7/1990 | Nelson et al. . | |
| 4,992,129 | 2/1991 | Sasaki et al. . | |
| 5,064,272 | 11/1991 | Bailey et al. . | |
| 5,066,098 | 11/1991 | Kult et al. . | |
| 5,508,105 | 4/1996 | Orensteen et al. . | |
| 5,553,951 | 9/1996 | Simpson et al. . | |
| 5,668,585 * | 9/1997 | Brechko | 347/220 |
| 5,706,133 | 1/1998 | Orensteen et al. . | |
| 5,763,049 | 6/1998 | Frey et al. . | |
| 5,784,198 | 7/1998 | Nagaoka . | |
| 5,818,492 | 10/1998 | Look . | |

FOREIGN PATENT DOCUMENTS

| | | | |
|---|---|---|---|
| 05270044 | 10/1993 | (JP) | B41J/2/38 |
| 07227977 | 8/1995 | (JP) | B41J/2/32 |
| WO 97/10956 | 3/1997 | (WO) . | |

* cited by examiner

*Primary Examiner*—N. Le
*Assistant Examiner*—K. Feggins
(74) *Attorney, Agent, or Firm*—Karl G. Schwappach

(57) ABSTRACT

A method of thermal mass transfer printing a colorant including a binder media from a ribbon onto a first surface of a web having a non-homogeneous thermal conductivity, a non-planar printing surface, a non-homogeneous structure or chemical incompatibility. The first surface of the web is preheated prior to thermal mass transfer printing. The surface of the ribbon containing the colorant is positioned opposite the first surface of the heated web at an inner face. A thermal print head is positioned at the interface on the side of the ribbon opposite the colorant. The web is moved relative to the thermal print head. Printing is completed by selectively applying localized heat to the ribbon from the thermal print head and pressure at the interface to cause the transfer of colorant from the ribbon to the heated web.

15 Claims, 5 Drawing Sheets

METHOD AND SYSTEM FOR THERMAL MASS TRANSFER PRINTING

FIELD OF THE INVENTION

The present invention relates to an improved process for thermal mass transfer printing on substrates, and in particular, to preheating the substrate to compensate for differences in thermal conductivity, surface topography and/or chemical incompatibility.

BACKGROUND OF THE INVENTION

Thermal printing is a term broadly used to describe several different families of technology for making an image on a substrate. Those technologies include hot stamping, direct thermal printing, dye diffusion printing and thermal mass transfer printing.

Hot stamping is a mechanical printing system in which a pattern is stamped or embossed through a ribbon onto a substrate, such as disclosed in U.S. Pat. No. 4,992,129 (Sasaki et al.). The pattern is imprinted onto the substrate by the application of heat and pressure to the pattern. A colored material on the ribbon, such as a dye or ink, is thereby transferred to the substrate where the pattern has been applied. The substrate can be preheated prior to imprinting the pattern on the substrate. Since the stamp pattern is fixed, hot stamping cannot easily be used to apply variable indicia or images on the substrate. Consequently, hot stamping is typically not useful for printing variable information, such as printing sheets used to make license plates.

Direct thermal printing was commonly used in older style facsimile machines. Those systems required a special substrate that includes a colorant so that localized heat can change the color of the paper in the specified location. In operation, the substrate is conveyed past an arrangement of tiny individual heating elements, or pixels, that selectively heat (or not heat) the substrate. Wherever the pixels heat the substrate, the substrate changes color. By coordinating the heating action of the pixels, images such as letters and numbers can form on the substrate. However, the substrate can change color unintentionally such as when exposed to light, heat or mechanical forces.

Dye diffusion thermal transfer involves the transport of dye by the physical process of diffusion from a dye donor layer into a dye receiving substrate. Similar to direct thermal printing, the ribbon containing the dye and the substrate is conveyed past an arrangement of heating elements (pixels) that selectively heat the ribbon. Wherever the pixels heat the ribbon, solid dye liquefies and transfers to the substrate via diffusion. Some known dyes chemically interact with the substrate after being transferred by dye diffusion. Color formation in the substrate may depend on a chemical reaction. Consequently, the color density may not fully develop if the thermal energy (the temperature attained or the time elapsed) is to low. Thus, color development using dye diffusion is often augmented by a post-printing step such as thermal fusing. Alternatively, U.S. Pat. No. 5,553,951 (Simpson et al.) discloses one or more upstream or downstream temperature controlled rollers to provide greater temperature control of the substrate during the printing process.

Thermal mass transfer printing, also known as thermal transfer printing, non-impact printing, thermal graphic printing and thermography, has become popular and commercial successful for forming characters on a substrate. Like hot stamping, heat and pressure are used to transfer an image from a ribbon onto a substrate. Like direct thermal printing and dye diffusion printing, pixel heaters selectively heat the ribbon to transfer the colorant to the substrate. However, the colorant on the ribbon used for thermal mass transfer printing includes a polymeric binder, typically composed of wax and/or resin. Thus, when the pixel heater heats the ribbon, the wax and resin mass transfers from the ribbon to the substrate.

One problem with thermal mass transfer printing is producing high quality printing on non-compatible surfaces, such as non-planar or rough surfaces, surfaces with non-uniform thermal conductivity, and when the composition of the substrate is not chemically compatible with the binders in the colorant.

FIG. 1 illustrates one example of a substrate 20 that has both a rough or non-smooth printing surface 22 and a non-homogenous thermal conductivity. The retroreflective sheeting 20 includes a plurality of glass beads 24 attached to a backing 26 by resin/polymer matrix 28. In the illustrated embodiment, a retroreflective layer 29 is interposed between the backing 26 and the resin/polymer matrix 28. The glass beads 24 protrude from the resin/polymer matrix 28 typically by an amount of about 1 micrometers to about 5 micrometers, forming a rough or non-planar surface for thermal mass transfer printing.

Since the retroreflective sheeting 20 is not constructed of a single, homogenous material, the thermal conductivity along the printing surface 22 may vary. For example, the thermal conductivity of the glass beads 24 may be different from thermal conductivity of the resin/polymer matrix 28. In addition, thermal conductivity may be effected by the varying thickness of the backing 26, voids in the backing 26 or mounds or piles of glass beads 24 on the retroreflective sheeting 20. Consequently, applying an image to the printing surface 22 using conventional thermal mass transfer printing techniques can result in a variable thickness in the thermal mass transfer layer 23 and/or a variable adhesion of the colorant pixel dots, with a corresponding degradation in the print quality.

FIG. 2 illustrates an alternate substrate having a printing surface 30 with variable thermal conductivity. FIG. 2 illustrates a sealed or encapsulated retroreflective sheeting 32. Microspheres or glass beads 34 are bonded to a bonding layer 36 with an optional reflecting layer 38 interposed therebetween. A protective layer 40 is attached to the bonding layer 36 by a plurality of raised supports 42. The protective layer 40 forms a space 44 above the microspheres 34. Consequently, the thermal conductivity of the printing surface 30 varies significantly between the regions over the spaces 44 and regions over the raised supports 42. It is typical for the thickness and percent coverage of a thermal mass transfer layer 46 to vary between the regions over the spaces 44 and the regions over the raised supports 42.

FIG. 3 illustrates an example of sealed or encapsulated retroreflective sheeting in which the raised supports form a hexagonal pattern on the printing surface. Due to the variation in thermal conductivity of the printing surface, the hexagonal pattern of the raised support shows through the printed image on the retroreflective sheeting of FIG. 3.

U.S. Pat. No. 5,818,492 (Look) and U.S. Pat. No. 5,508,105 (Orensteen et al.) teach that thermal mass transfer printing can be performed on retroreflective sheeting in those instances where there is a polymeric layer or layers disposed thereon. While adding a polymeric layer has improved printability on some retroreflective sheeting, the process of adding the layer increases the cost of the final product and can degrade the retroreflective properties of the substrate. Even with the additional layer, the print quality is inadequate for some graphics applications. Adding a printable layer may alter other characteristics of the retroreflective sheeting, such as frangibility.

In order to use thermal mass transfer printing on a non-compatible surface, the most common methods of improving print quality is to increase the thermal energy of the print head and to increase the pressure applied to the print head by the backup roll. However, increasing thermal energy and pressure can lead to decreased printer head life, ribbon wrinkling, lower print quality and mechanical stresses in the printing system. Therefore, what is needed is a method and apparatus for thermal mass transfer printing on substrates that have a rough surface, non-homogenous thermal conductivity, and/or a surface composition that is not immediately compatible with the colorant of the thermal mass transfer printing ribbon.

BRIEF SUMMARY OF THE INVENTION

The present invention is directed to a method and apparatus for preheating the substrate to a certain temperature, depending upon the particular substrate and colorant to be used, in order to increase the thermal energy of the substrate surface to improve print quality at low print head thermal energy and pressure in a thermal mass transfer printing system. The present method and apparatus enlarges the field of thermal mass transfer materials/web combinations that are useful for thermal mass transfer printing. The present method is suitable for webs that have a non-planar printing surface, such as an unsealed retroreflective sheeting, non-homogeneous thermal conductive, such as a seal or unsealed retroreflective sheeting, or a surface that is chemically incompatible with the binder in the colorant.

In one embodiment, the apparatus includes a heater positioned inside the chassis of the thermal mass transfer printer near the print head in the up-web direction. As the web moves, the heater directs radiant energy onto the substrate, preheating the surface and making it more receptive to the printed image. The apparatus preferably includes uniform cross web heating that is adjustable via an external, dedicated control or via an interface to the image-generating computer. The output of the heater is typically adjusted to the minimum level necessary to achieve optimum print quality. On multiple head printers, a similar heater may optionally be positioned upstream of each print head. The apparatus may optionally be equipped with a radiant heater and heat shield shutter to enable instant on/instant off cycling. In one embodiment, the shutter is a venetian-blind structure that can be opened and closed to expose intermittently the web to the radiant heat source.

In one embodiment, the method for thermally transferring a colorant that includes a binder media from a ribbon onto a first surface of a web having a non-homogeneous thermal conductivity (heat capacity) includes preheating the first surface of the web prior to thermal mass transfer printing. The surface of the ribbon containing the colorant is positioned opposite the first surface of the heated web at an interface. A thermal print head is positioned at the interface on the side of the ribbon opposite the colorant. The web is moved relative to the thermal print head. Printing is completed by selectively applying localized heat to the ribbon from the thermal print head and pressure at the interface to cause the transfer of colorant from the ribbon to the heated web.

In another embodiment, the present invention includes positioning a plurality of thermal print heads at a plurality of respective interfaces opposite the colorant on the ribbons. In one embodiment, the first surface of the web is preheating prior to engagement with each of these interfaces. In an embodiment with multiple print heads, ribbons with different colorants can be used at each of the print heads.

DETAILED DESCRIPTION OF THE INVENTION

Colorant refers to a binder media of wax, resin or a combination thereof containing pigments and/or dyes that is capable of providing an image or indicia on the surface of the web. Thermal mass transfer printing refers to those processes that transfer colorant from a ribbon to a substrate by the simultaneous application of localized heat and pressure. Ribbon refers to a carrier web having a layer of colorant on one surface. Chemical incompatibility refers generally to low adhesion of the colorant, lack of surface penetration between the colorant and the web, and wetting out of the colorant during thermal mass transfer printing, thereby increasing the percent void in the printed image.

Figure 4:
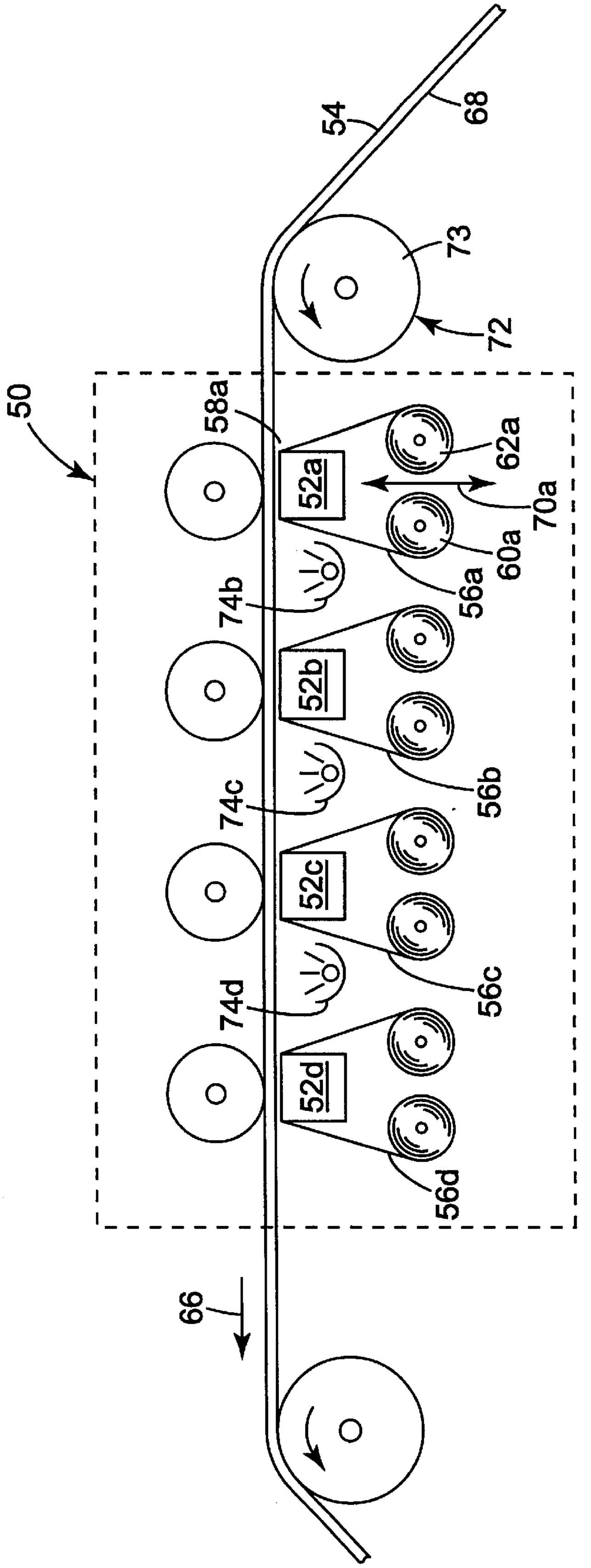
FIG. 4 is a schematic illustration of a thermal mass transfer printer in accordance with the present invention.

FIG. 4 is a schematic illustration of a thermal mass transfer printer 50 in accordance with the present invention. Print head **52*a* is positioned to engage with a first side 68 of a moving web 54 as it passes through the thermal mass transfer printer 50. A thermal mass transfer ribbon 56*a* is delivered to an interface 58*a* between the print head 52*a* and the moving web 54. In the illustrated embodiments, the thermal mass transfer ribbon 56*a* is held in tension across the print head 52*a* by a supply reel 60*a* and a take-up reel 62*a*. A back up roll 64*a* is located along the opposite side of the web 54 to maintain pressure at the interface 58*a***.

The web 54 is transported in the direction 66 by known mechanisms, such as a friction drive mechanism using a stepper motor. The print head **52*a* remains stationery and makes contact with the thermal mass transfer ribbon 56*a* and transfers the colorant from the ribbon 56*a* to the first side 68 of the moving web 54. When the transfer of colorant is completed or is not to be applied, the print head 52*a* and the thermal mass transfer ribbon 56*a* may optionally be retracted from the moving web 54 along an axis 70**.

A heater 72 is located upstream of the print head 52*a*. In the illustrated embodiment, the heater is a hot can roll 73. The amount the web 54 wraps around the hot can roll 73 can vary depending upon the application. For some applications, the hot can roll 73 is polished and/or includes a Teflon® plasma coating to prevent the web 54 from sticking at higher temperatures. The hot can roll 73 is heated by a conventional electric tube type heater that is held stationary while the hot can 73 rotates. The hot can roll 73 can be mounted by bearings so that it rolls freely with the moving web 54. In the illustrated embodiment, the heater is rated at 2400 watts, or about 200 watts per inch. Alternate heaters include convection heaters, UV heaters, microwave generators, RF generators, hot lamps and the like.

The thermal mass transfer printer 50 of FIG. 4 includes four print heads 52*a*, 52*b*, 52*c*, 52*d*, and the associated structure. In an alternate embodiment, additional heaters 74*b*, 74*c*, 74*d* are located upstream (based on the web travel directions 66) of the thermal print heads 52*b*, 52*c*, 52*d*. In the illustrated embodiment, the additional heaters 74*b*, 74*c*, 74*d* are heat lamps. In the embodiment illustrated in FIG. 4, indicia or images of more than one color can be applied to the moving web 54. Four color or process color printing can be achieved by using thermal mass transfer ribbons with black, magenta, cyan and yellow colorant as transparent color overlays with each of the print heads 52*a*, 52*b*, 52*c* and 52*d*.

The thermal print head 52*a*, 52*b*, 52*c*, and 52*d* operate to transfer discrete areas of colorant to the first side 68 of the web 54. The size of the colorant transfer area, or dot, can be determined by the area of each discreet heated element on the print heads. Such dots are generally about 0.006 square millimeters, which is the area of a single pixel. The resolution of indicia printed by the print heads 52*a*, 52*b*, 52*c*, and 52*d* generally is from about 75 to about 250 dots per lineal centimeter.

The term "thermal print head" refers to the mechanism or mechanisms by which a localized heat for the transfer of colorant is generated. The localized heat can be generated by resistive elements, ribbon contacting elements in a laser system, electronic elements, thermally activated valve elements, inductive elements, thermopile elements, and the like. An example of a print head that can be incorporated into the thermal mass transfer printer 50 of FIG. 4 is the print head incorporated into an apparatus sold under the trade name Model Z170, manufactured by Zebra Technologies Corporation of Vernon Hills, Ill. The thermal mass transfer ribbons 56*a*, 56*b*, 56*c* and 56*d* may have a wax base, a resin base, or a combination of wax and resin based binder. Commercially available ribbons suitable for use in the thermal mass transfer printer 50 of FIG. 4 are available under the trade name Zebra by Zebra Technologies Corporation, model numbers 5030, 5099 and 5175. Theses thermal mass transfer ribbons typically include a backing of polyester about 6 micrometer thick and a layer of colorant about 0.5 micrometers to about 6.0 micrometers thick. Additional disclosure relating to conventional thermal mass transfer printing techniques are set forth in U.S. Pat. No. 5,818,492 (Look) and U.S. Pat. No. 4,847,237 (Vanderzanden).

Figure 1:
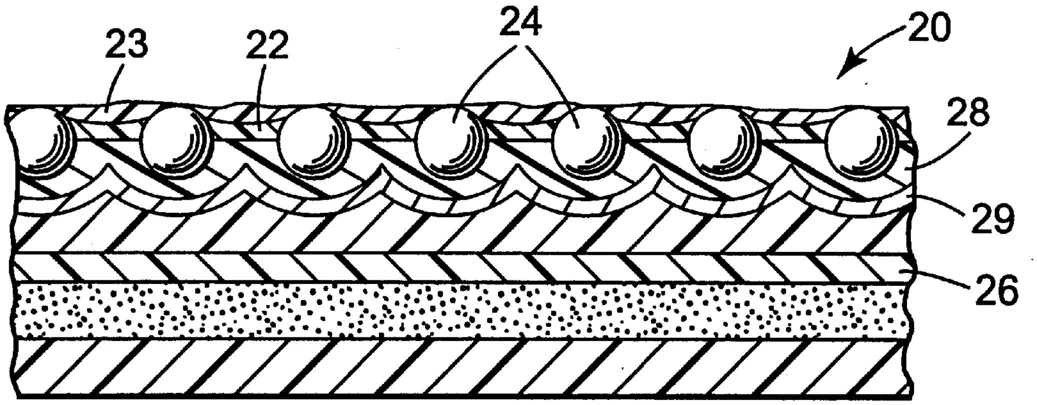
FIG. 1 is a side sectional view of an image formed on a beaded retroreflective sheeting using conventional thermal mass transfer printing.
Figure 2:
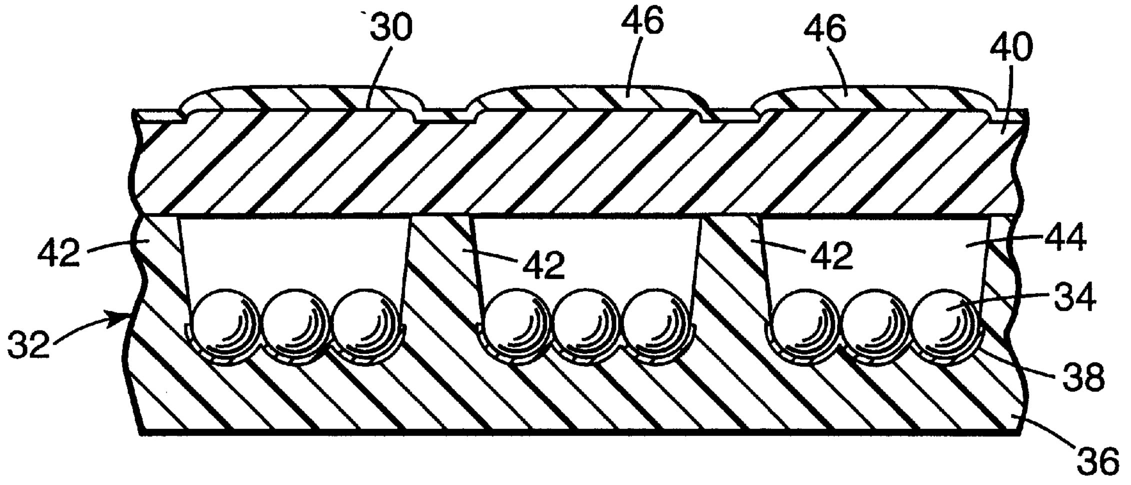
FIG. 2 is a side sectional view of an image formed on a sealed retroreflective sheeting using conventional thermal mass transfer printing.
Figure 5:
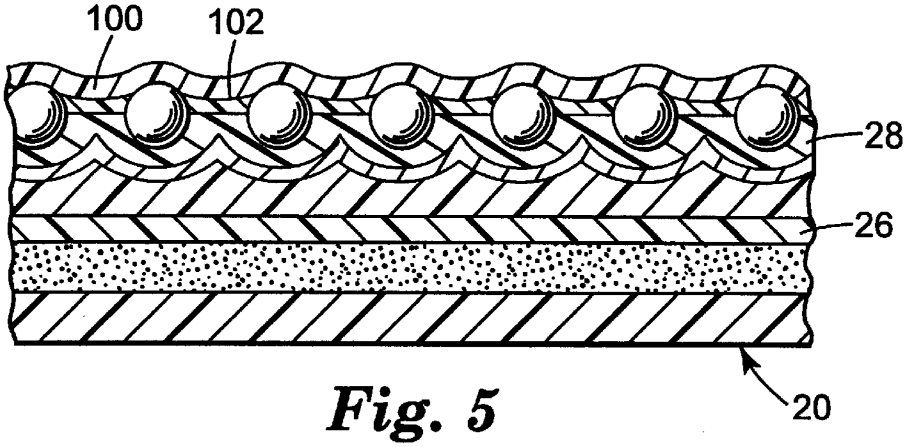
FIG. 5 is a side sectional view of an exposed bead sheeting having a thermal mass transfer image applied in accordance with the method of the present invention.

FIG. 5 is an enlarged cross-sectional view of the retroreflective sheeting 20 of FIG. 1 having an image 100 formed on the non-planar printing surface 102 using the thermal mass transfer printing method and apparatus of the present invention. A non-planar printing surface refers to a surface roughness of at least 1 micrometer to about 5 micrometers. A sealed retroreflective sheeting can have a surface roughness of about 10 micrometers to about 15 micrometers. The retroreflective sheeting 20 also has a non-homogenous structure as measured along a vertical axis and voids in the resin/polymer matrix 28 that bonds the beads to the backing 26. As is illustrated in FIG. 1, the thermal mass transfer printing layer forming the image 100 has a generally uniform adherence of the thermal mass to the retroreflective sheeting 20.

Figure 6:
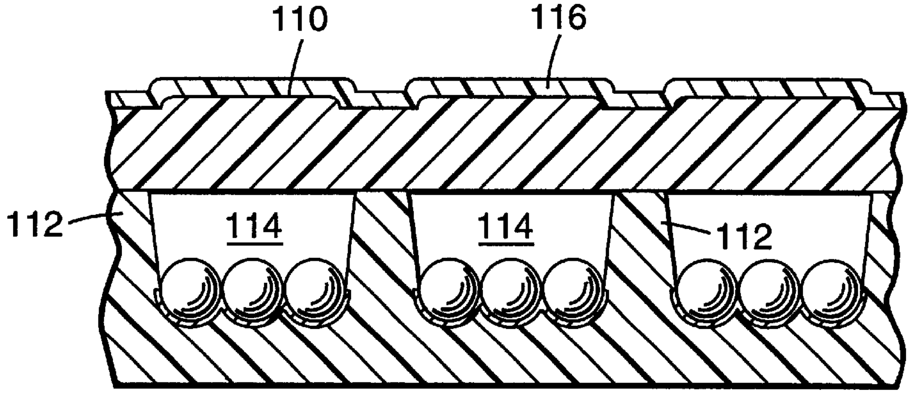
FIG. 6 is a side sectional view of a sealed retroreflective sheeting having a thermal mass transfer image applied in accordance with the method of the present invention.

FIG. 6 is a side sectional view of a sealed retroreflective sheeting having a printing surface 110. The combination of the raised supports 112 and the spaces 114 result in a non-uniform thermal conductivity and heat capacity across the printing surface 110, at measured along an axis normal to the printing surface 110. The present method and apparatus for thermal mass transfer printing resulted in a substantially uniform thermal mass transfer printed layer 116 in spite of the non-uniformity in thermal conductivity.

Figure 7:
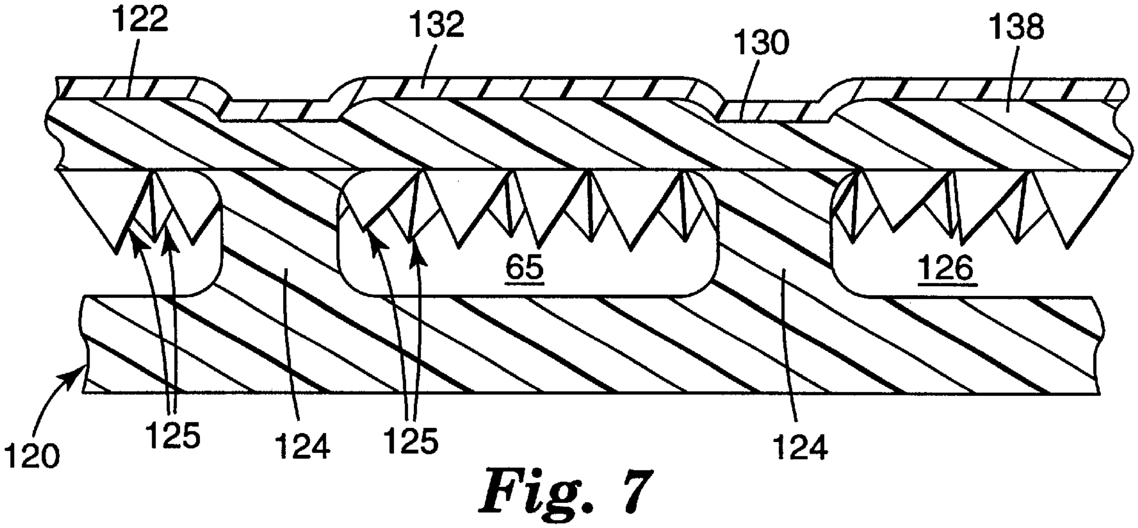
FIG. 7 is a side sectional view of an alternate sealed retroreflective sheeting having a thermal mass transfer image applied in accordance with the method of the present invention.

FIG. 7 is a side sectional view of a sealed retroreflective sheeting 120 that has a printing surface 122 that is both non-planar and has a non-uniform thermal conductivity and heat capacity. As discussed above, the raised supports 124 and the spaces 126 result in a non-uniform thermal conductivity across the printing surface 122. The irregular surface created by the cube corner elements 125 also contributes to the non-uniformity of the thermal conductivity. Additionally, the process of applying the sealing film 138 resulted in depressions or sealed lines 130 across the printing surface 122. Notwithstanding these two disadvantages, the present method and apparatus provides a substantially uniform thermal mass transfer printing layer 132 across the printing surface 122.

Figure 3:
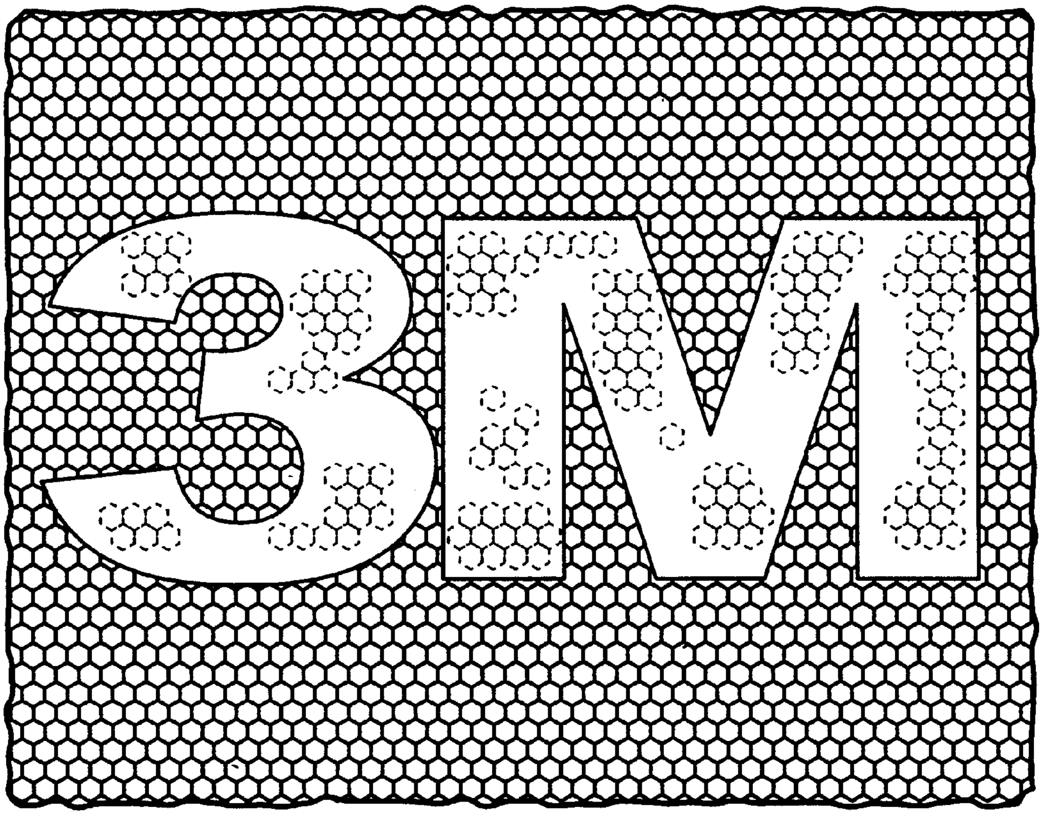
FIG. 3 is an image formed on a sealed retroreflective sheeting using conventional thermal mass transfer printing.
Figure 8:
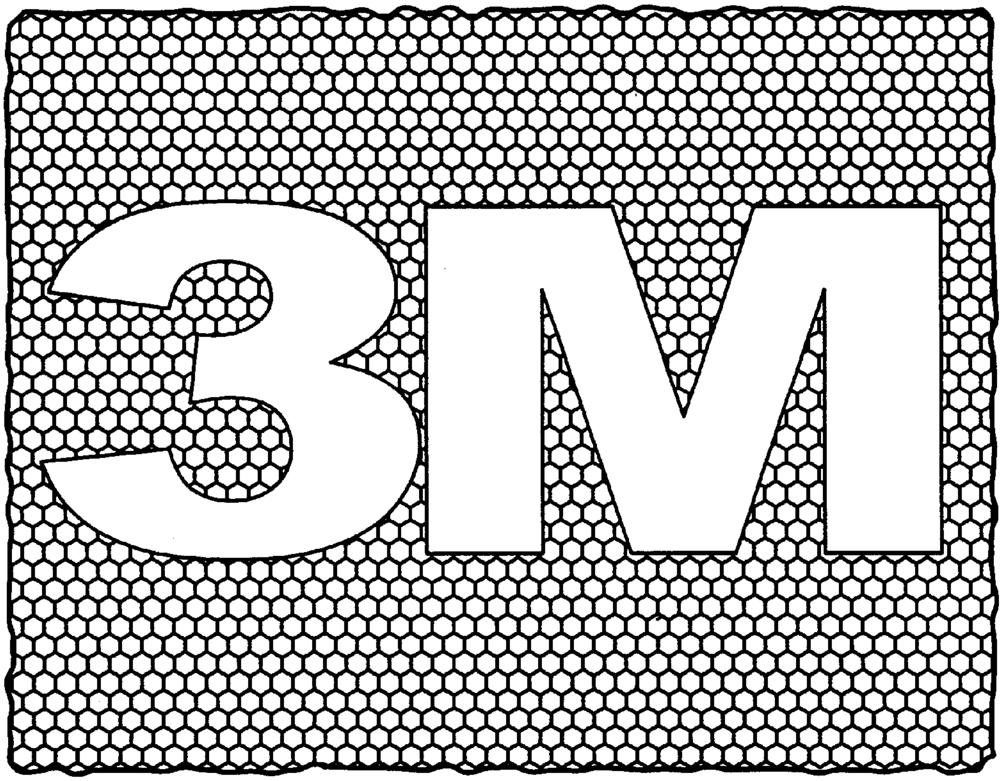
FIG. 8 is an exemplary image formed on a sealed retroreflective sheeting applied in accordance with the method of the present invention.

FIG. 8 illustrates a logo printed on a sealed retroreflective sheeting using the thermal mass transfer printing method and apparatus of the present invention. Contrary to the results shown in FIG. 3, the present method and apparatus results in a substantially uniform image in spite of the hexagonal sealed lines and corresponding non-uniformity of thermal conductivity.

The present method and apparatus for thermal mass transfer printing may be used to produce alphanumeric characters, graphic images, bar codes, or the like. The web may be a sealed or unsealed retroreflective sheeting, for example a cube corner sheeting disclosed in U.S. Pat. Nos. 3,684,348, 4,801,193, 4,895,428 and 4,938,563; or a beaded lens sheeting comprising an exposed lens element, encapsulated lenses, or enclosed lenses such as disclosed in U.S. Pat. Nos. 2,407,680, 3,190,178, 4,025,159, 4,896,943, 5,064,272 and 5,066,098.

EXAMPLES

Example 1

A series of matched pairs of print samples were prepared using a thermal mass transfer printer generally as illustrated in FIG. 4, with and without preheating the web prior to printing. All samples were thermal mass transfer printed with a DC300 sapphire blue, thermal mass transfer ribbon available from IIMAK Corp. of Amhurst, N.Y. The percent void in the solid image generated was then evaluated. The webs moved through the printer at a line speed of about 7.62 centimeters/second (3 inches/second). The same image and thermal energy was applied to the webs during printing. For those samples that were preheated, the preheat temperature ranged from about 76.7° C. to about 93.4° C. (170° F. to 200° F.), as indicated in Table 1.

Web samples A, B, I, J, O, and P were Scotchlite Retroreflective License Plate Sheeting, Series 3750 from Minnesota Mining and Manufacturing Company of St. Paul, Minn., with a top coat of plasticized polyvinyl chloride-vinyl acetate-vinyl alcohol terpolymer. Web samples C and D were Scotchlite Retroreflective License Plate Sheeting, Series 4770A from Minnesota Mining and Manufacturing Company of St. Paul, Minn., with a top coat of crosslinked aliphatic urethane. Web samples E and F were Scotchlite High Intensity Grade Retroreflective Sheeting, Series 3870 from Minnesota Mining and Manufacturing Company of St. Paul, Minn., with an acrylic top coat. Web samples G and H were Scotchlite Diamond Grade Sheeting, Series 3970 from Minnesota Mining and Manufacturing Company of St. Paul, Minn., with an acrylic top coat. Web samples K and L were Scotchlite Retroreflective License Plate Sheeting, Series 3750, with an exposed surface of polyvinyl butyral and exposed glass beads. Web samples M and N were Scotchlite Retroreflective License Plate Sheeting, Series 3750 with a top coat of crosslinked aliphatic urethane. Web samples Q and R were Scotchlite Retroreflective License Plate Sheeting, Series 3750, with a top coat of aliphatic polyester urethane. Web samples S and T were Scotchlite Retroreflective License Plate Sheeting, Series 4770A, with a top coat of extruded ethylene-acrylic acid copolymer.

TABLE 1

| Sample - No preheat/ preheated | Preheat Temperature | No preheat - % voids in solid image | Preheated - % voids in solid image | Percent reduction in void with preheating |
|---|---|---|---|---|
| A, B | 93.4° C. | 1.03 | 0.065 | 93.4% |
| C, D | 93.4° C. | 0.42 | 0.089 | 78.8% |
| E, F | 76.7° C. | 13.7 | 1.46 | 89.3% |
| G, H | 76.7° C. | 0.099 | 0.044 | 55% |
| I, J | 93.4° C. | 0.16 | 0.007 | 95.6% |
| K, L | 93.4° C. | 0.055 | 0.022 | 60% |
| M, N | 93.4° C. | 0.75 | 0.14 | 81.3% |
| O, P | 93.4° C. | 0.01 | 0.002 | 80% |
| Q, R | 93.4° C. | 0.17 | 0.009 | 94.7% |
| S, T | 93.4° C. | 0.066 | 0.008 | 87.9% |

Use of the method and apparatus of the present invention for preheating the webs resulted in a percentage reduction of voids in the solid image of between about 55% and 95.6%. The most dramatic visual improvement in image quality appeared in samples E and F. Samples C and D are probably the most difficult webs to thermal mass transfer print due to the chemical incompatibility of the web and the thermal mass on the ribbon. Preheating the web resulted in a 78.8 reduction of voids in the solid image. The exposed lens beaded sheeting of sample K and L exhibited the greatest surface roughness. Preheating resulted in a percentage reduction of voids in the solid image of about 60%.

All patents and patent applications disclosed herein, including those disclosed in the background of the invention, are hereby incorporated by reference. While several embodiments of the present invention have now been described, it will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A method of thermal mass transfer printing a colorant from a ribbon onto a first surface of a web, comprising the steps of:

preheating the first surface of the web to form a heated web, the web comprising one or more of a non-planar surface, a surface with non-homogeneous thermal conductivity, and a surface chemically incompatible with the colorant;

positioning a surface of the ribbon containing the colorant opposite the first surface of the heated web at an interface;

positioning a thermal print head at the interface on a side of the ribbon opposite the colorant;

moving the web relative to the thermal print head; and selectively applying localized heat and pressure to the ribbon from the thermal print head at the interface to cause the transfer of the colorant from the ribbon to the heated web.

2. The method of claim 1 wherein the web comprises an unsealed retroreflective sheeting.

3. The method of claim 1 comprising the step of moving the web past a stationary thermal print head.

4. The method of claim 1 comprising the step of positioning a plurality of thermal print heads at a plurality respective interfaces.

5. The method of claim 1 comprising the steps of:

positioning a plurality of thermal print heads at a plurality of interfaces; and heating the first surface of the web prior to moving the web to each of the plurality of interfaces.

6. The method of claim 1 comprising the steps of:

advancing the web past a plurality of stationary thermal print heads; and locating a heat source upstream of each thermal print head.

7. The method of claim 1 comprising the step of positioning a surface of a plurality of ribbons containing the colorant opposite the first surface of the heated web at a plurality of respective interfaces formed with a plurality of corresponding thermal print heads.

8. The method of claim 7 wherein two or more of the ribbons contain colorants having different colors.

9. The method of claim 1 wherein the web comprises a sealed retroreflective sheeting.

10. The method of claim 1 wherein the web comprises an exposed lens retroreflective sheeting.

11. A method of thermal mass transfer printing a colorant from a ribbon onto a first surface of a web, comprising the steps of:

positioning a surface of the ribbon containing the colorant opposite the first surface of the web at an interface, the first surface comprising a surface chemically incompatible with the colorant;

positioning a thermal print head at the interface on a side of the ribbon opposite the colorant;

preheating the first surface of the web to form a heated web prior to advancing the web past the thermal print head; and selectively applying localized heat and pressure to the ribbon from the thermal print head at the interface to cause the transfer of the colorant from the ribbon to the heated web.

12. A method of thermal mass transfer printing a colorant from a ribbon onto a non-planar first surface of a web, comprising the steps of:

preheating the non-planar first surface of the web;

positioning a surface of the ribbon containing the colorant opposite the first surface of the heated web at an interface;

positioning a thermal print head at the interface on a side of the ribbon opposite the colorant;

moving the web relative to the thermal print head; and selectively applying localized heat and pressure to the ribbon from the thermal print head at the interface to cause the transfer of the colorant from the ribbon to the heated web.

13. A method of thermal mass transfer printing a colorant from a ribbon onto a first surface of a web having a non-homogeneous structure as measured along an axis normal to the first surface, comprising the steps of:

preheating the non-homogeneous structure of the web;

positioning a surface of the ribbon containing the colorant opposite the first surface of the heated web at an interface;

positioning a thermal print head at the interface on a side of the ribbon opposite the colorant;

moving the web relative to the thermal print head; and selectively applying localized heat and pressure to the ribbon from the thermal print head at the interface to cause the transfer of the colorant from the ribbon to the heated web.

14. A method of thermal mass transfer printing a colorant from a ribbon onto a first surface of a web, comprising the steps of:

preheating the first surface of the web to form a heated web, the web comprising a non-homogeneous heat capacity;

positioning a surface of the ribbon containing the colorant opposite the first surface of the heated web at an interface;

positioning a thermal print head at the interface on a side of the ribbon opposite the colorant;

moving the web relative to the thermal print head; and selectively applying localized heat and pressure to the ribbon from the thermal print head at the interface to cause the transfer of the colorant from the ribbon to the heated web.

15. A method of thermal mass transfer printing a colorant from a ribbon onto a first surface of a web, comprising the steps of:

preheating the first surface of the web to form a heated web, the web comprising a non-uniform heat capacity;

positioning a surface of the ribbon containing the colorant opposite the first surface of the heated web at an interface;

positioning a thermal print head at the interface on a side of the ribbon opposite the colorant;

moving the web relative to the thermal print head; and selectively applying localized heat and pressure to the ribbon from the thermal print head at the interface to cause the transfer of the colorant from the ribbon to the heated web.

* * * * *

UNITED STATES PATENT AND TRADEMARK OFFICE

CERTIFICATE OF CORRECTION

PATENT NO. : 6,246,428 B1
DATED : June 12, 2001
INVENTOR(S) : Look, Thomas F.

It is certified that error appears in the above-identified patent and that said Letters Patent is hereby corrected as shown below:

Title page,
Item [56], References Cited, U.S. PATENT DOCUMENTS, delete “5,668,585” and insert in place thereof -- 5,568,585 --.

Column 8,
Line 27, delete “Theses” and insert in place thereof -- These --.

Signed and Sealed this

Eighteenth Day of March, 2003

JAMES E. ROGAN
*Director of the United States Patent and Trademark Office*